A. E. DIETERICH.
METHOD OF EXTRACTING THE MOLDED AND BAKED PRODUCTS FROM PASTRY MOLDS.
APPLICATION FILED JULY 3, 1917.

1,280,422.  Patented Oct. 1, 1918.

INVENTOR
Albert E. Dieterich
BY
Fred G. Dieterich
ATTORNEYS.

UNITED STATES PATENT OFFICE.

ALBERT E. DIETERICH, OF WASHINGTON, DISTRICT OF COLUMBIA, ASSIGNOR TO FREDERICK A. BRUCKMAN, OF PORTLAND, OREGON.

METHOD OF EXTRACTING THE MOLDED AND BAKED PRODUCTS FROM PASTRY-MOLDS.

1,280,422.     Specification of Letters Patent.      Patented Oct. 1, 1918.

Application filed July 3, 1917. Serial No. 178,425.

*To all whom it may concern:*

Be it known that I, ALBERT E. DIETERICH, a citizen of the United States, residing at Washington, in the District of Columbia, have invented certain new and useful Improvements in Methods of Extracting the Molded and Baked Products from Pastry-Molds, of which the following is a specification.

My invention relates to the art of pastry molding and baking, and it primarily relates to the art of baking ice cream cones and similar cup pastry. Machines have been devised for making ice cream cones and they may be divided into two distinct types namely—first: that type in which the batter is baked in flat disk or waffle form and subsequently rolled on a conical mandrel to produce what is known in the trade as a rolled or waffle cone, and secondly: that type in which the batter is rolled around a conical core in coni-form molds and baked in such molds to produce what is known as a molded cone. My invention has relation to the latter type of baking apparatus. The molded cone machines are of the purely hand operated type, *i. e.*, those in which the various functions are performed manually; the semi-automatic type, *i. e.*, those in which some of the functions are automatic while others require manual assistance, and thirdly, the purely automatic,—those in which the intervention of manual action is not normally required from the time the batter is placed in the receiver until the finished product leaves the machine.

While my invention has been especially devised for use in the purely automatic type of machine, it may nevertheless be employed in the other types as well, so I do not desire to be understood as limiting myself to the use of my invention to either of the types stated, but desire it understood that the invention may be used on any type of pastry baking machine employing split molds.

My present invention consists in providing an improved method of removing the pastry from the molds after the molding and baking operation is completed.

In the automatic type of machine (see Bruckman Patent #1,071,027 issued August 26, 1913) the cone is extracted from the molds by loosening the core before the molds are opened up and while the core is still within the cone to act as a finger throughout the length of the cone, while the molds are opened and the cone is stripped by the core from the halves of the mold. In the Bruckman type of machine, the female molds are made of two parts which separate laterally and are divided in the longitudinal direction of the cone.

Other molds have been provided in which the female mold member is made up of two or more sections horizontally divided and separable at right angles to the division planes, whereby a part of the female mold may be released from the core in advance of the release of the other part to permit the introduction of a holder between the separated female mold parts, which holder retains the cone against follow-up motion when the remaining part of the female mold opens up (see, for example, my application filed February 16, 1917 under Serial No. 149,051 patented November 20, 1917, Patent No. 1,247,090). In the one case, (Bruckman machine) the core acts as the detaching medium for releasing the cone from the female molds whereas in the other case, an extra part, the cone receiver, is required to be employed to hold the cone by external engagement, before the final release is effected.

My present invention has for its object to provide a method of releasing or extracting the cone which will not require the employment of a cone receiver, as in my application above referred to, and which may dispense with the use of the core as the stripping finger and cause the entire releasing act to be accomplished by the female mold sections themselves.

In applying my method of extracting the cones, the female molds are made in at least two transversely divided sets or sections, each set consisting of a pair of half mold members separable from each other on a longitudinal division plane, the several sets of half mold members being adapted to have independent opening and closing movement.

My invention, in its generic nature, consists in the method of releasing the cone by opening and reclosing the half mold members of one section of the female mold before opening the remaining sections and following the opening act of the remaining sections by reopening the reclosed section so that a part of the cone may be detached from the female mold and then regrasped preferably by the part from which it was detached and held while detaching the remaining part.

Figures 1, 2:
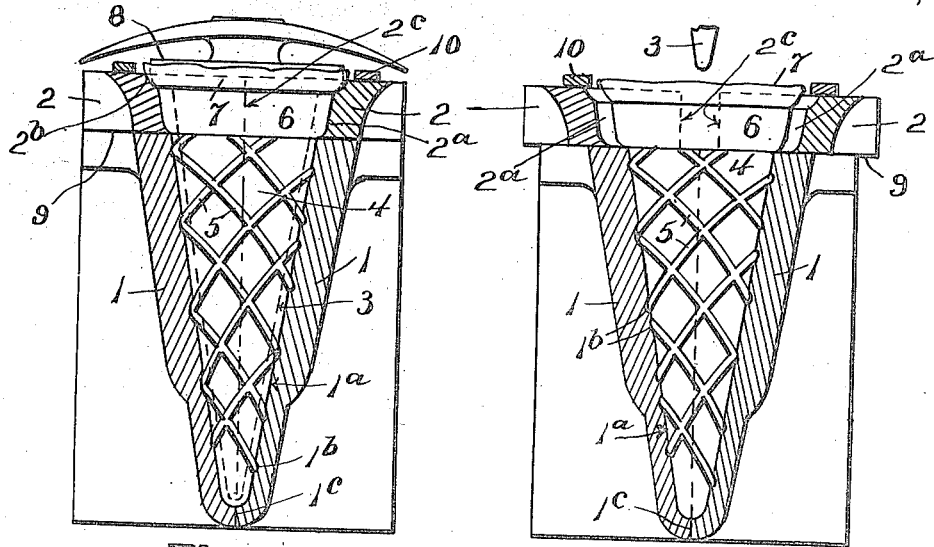
Figure 1 is a diagrammatic section of a mold unit (including the female mold and the core) showing a cone baked in the mold.
Fig. 2 is a view similar to Fig. 1 showing the core elevated out of the cone and mold and the upper section of the female mold partly separated to detach the cone therefrom.

In carrying out my invention, I prefer to use molds composed of two or more transversely divided sets of half mold members 1—1 and 2—2 divided along a transverse plane 9. Each half mold member 1 is formed with the cone cavity $1^a$, the inner face of which is preferably grooved at $1^b$ to form the ribs 5 on the cone 4, it being understood that a function of the grooves $1^b$ is to form the female mold cavity $1^a$ relatively of a rougher surface than the surface of the core 3, so that when the core is pulled up, the cone will adhere to the female mold until the female mold is opened.

The cone 4 is usually constructed with a smooth neck 6 and in the molding operation is formed with a head 7 caused by the overflow or surplus batter which squeezes out between the surface of the upper mold section 2 and the head 8 of the core.

The mold sections 1—1 and 2—2 are longitudinally divided on the plane $1^c$—$2^c$ so as to open up laterally with relation to the longitudinal axis of the cone.

10—10 designate fixed bars which may be used to hold the mold sections 2 down on the sections 1 and also act as stops to hold the cone against lateral follow-up motion when the female mold halves are opened up, in the event that the core is not used as a guide.

Assume the cone to have been molded and baked and ready for extraction, the parts will then be in the position shown in Fig. 1: The first operation, after withdrawing the core 3, is to open one pair of half mold members (say the members 2) sufficiently to cause them to become detached from the cone, the parts will then be in the position shown in Fig. 2. The next movement is to reclose the opened female mold sections 2—2 to again grasp the part of the cone which was molded by the same and the parts will then be in the position shown in Fig. 1 except that the core will be removed or out of the molds. The fourth step in the operation is to open the remaining sections of the female mold to detach them from the cone before the reclosed sections are again opened and the parts are then in the position shown in Fig. 3. As soon as the mold members 1—1 have been opened sufficiently to detach them from the cone, the mold members 1—1 and 2—2 will then move in unison toward the full open position to drop the cone out of the mold by the time the molds are opened to their final or widest extent (see Fig. 4); after which, the female mold members are again closed together and the mold will be ready for its new charge of batter. Should there be any tendency of the cone to follow the upper mold members when they are last opened this tendency may be relieved by permitting the core to project into the cone until the female mold members are completely opened, as in the Bruckman method, or the core may be entirely withdrawn and the bars 10 used to serve this function. It will be understood that the upper mold members having been positively released from the core there is no further tendency of the cone to stick or adhere to these mold members when they are reclosed, it being understood that the reclosing act need not be with the full locking pressure unless so desired. In any event, however, there is no further danger of the cone sticking to the members 2—2 when they are reclosed prior to the opening of the members 1—1 and hence on the final opening movement of the members 2—2 the slightest lateral stopping pressure on the cone head is sufficient to prevent it following the female mold members on the final opening up movement.

Figures 3, 4:
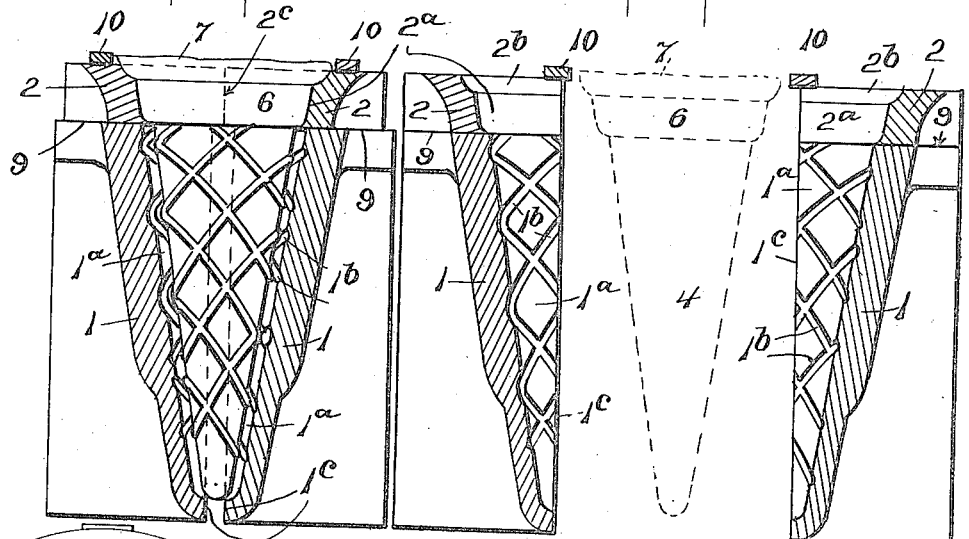
Fig. 3 is a view similar to Figs. 1 and 2 with the upper mold section reclosed to hold the cone and the lower mold section partly open to detach the cone therefrom.
Fig. 4 is a sectional view similar to the preceding figures with the mold fully open and the cone shown in dotted lines detached.
Figure 5:
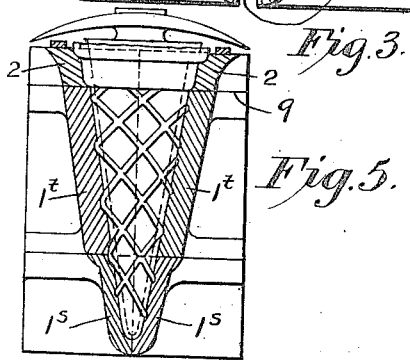
Fig. 5 is a detail view of a female mold unit made up of more than four sections, each set of sections being divided from the other horizontally on the line 9 and comprising the upper sections 2—2, the intermediate sections $1^T$—$1^T$ and the lower sections $1^S$—$1^S$.

I desire it understood that instead of opening the members 2—2 first, the members 1—1 may be first opened. In that event, Fig. 1 illustrates the first or initial position of all of the members before any opening movement is made; the second position, where the members 2—2 are first opened, is indicated in Fig. 2, (and the corresponding position, when the members 1—1 are opened first instead of 2—2, is shown in Fig. 3); the third position is where the members 2—2 closed again before the members 1—1 open, at which time the parts 1—1 and 2—2 will be in the position as shown in Fig. 1, (the core, however, being removed as in Figs. 2, 3 and 4); after the mold sections 2—2 are opened and then reclosed, the fourth position is reached, namely, that in which the members 1—1 open and this position is shown in Fig. 3, and the fifth or final position is shown in Fig. 4, this position being regardless of whether the sections 1—1 or 2—2 are opened first.

I also desire it understood that instead of making the female mold members in two sets 1—1 and 2—2 they may be made in a greater number of sets, separated by dividing planes 9 and opened in any desired order so long as at least one section is opened and reclosed for holding purposes while the remaining sections are opened for detaching purposes.

In this application I make no claim to the particular apparatus disclosed, or any particular means for operating the mold sections mechanically, the present application being for the method of extracting the cones irrespective of any particular apparatus that may be employed to open and close or operate the various mold parts.

While I have described the invention especially with relation to the method of molding ice cream cones, I desire it understood that it is applicable as well as to the manufacture of other molded pastry articles of cup-like formation.

What I claim is:

1. The method of extracting pastry from molding devices, which molding devices each includes a core and a female mold comprising a plurality of sets of longitudinally separable mold members; said method consisting in elevating the core sufficiently to release it from the pastry, opening one set of separable mold members and reclosing the same in advance of the commencement of the opening of the remaining mold members and finally fully opening all of the mold members to discharge the pastry.

2. The method of extracting pastry from molding devices, which molding devices each include a core and a female mold comprising a plurality of sets of longitudinally separable mold members; said method consisting in elevating the core sufficiently to release it from the pastry, opening one set of separable mold members and reclosing the same in advance of the commencement of the opening of the remaining mold members and finally fully opening all of the mold members to discharge the pastry while restraining the pastry against lateral mold following movement.

3. The method of extracting pastry from molding devices, which molding devices each include a core and a female mold comprising a plurality of sets of longitudinally separable mold members; said method consisting in elevating the core sufficiently to detach it from the cone, opening a set of mold members to detach the same from the pastry while holding another set of mold members closed, then reclosing the previously opened set and opening the remaining set or sets and finally reopening the first set.

4. The method of extracting pastry from molds which molds include a female element composed of a plurality of transversely divided laterally separable mold members arranged in sets; said method including the opening and reclosing of one set in advance of the opening of the remaining set or sets and then reopening the reclosed set to discharge the pastry.

5. The method of extracting pastry from molds which molds include a female element composed of a plurality of transversely divided laterally separable mold members arranged in sets; said method including the opening and reclosing of one set in advance of the opening of the remaining set or sets and then reopening the reclosed set to discharge the pastry while holding the pastry against mold following movement.

6. The method of extracting pastry from molds which molds comprise a plurality of transversely-divided longitudinally-separable sections; said method consisting in opening certain sections sufficiently to disengage the pastry before opening the remaining sections, reclosing said opened sections until the remaining sections are opened sufficiently to disengage the pastry and finally opening all sections to drop the pastry out.

7. The method of extracting pastry from molds which molds comprise a plurality of transversely-divided longitudinally-separable sections; said method consisting in opening certain sections sufficiently to disengage the pastry before opening the remaining sections, reclosing said opened sections until the remaining sections are opened sufficiently to disengage the pastry and finally opening all sections to drop the pastry out, while restraining the pastry from lateral mold-following movement whereby to allow the pastry to drop freely from the open molds.

8. The method of extracting pastry from pastry molding devices which devices each include a core and a female mold member, which device comprises a plurality of sets of separable sections; said method consisting in partially elevating the core to release it from the pastry, holding a set of mold members closed while opening and reclosing another set, and finally opening all sets to drop the pastry.

9. The method of extracting pastry from pastry molding devices, which devices each include a core and a female mold member, which devices comprise a plurality of sets of separable sections; said method consisting in elevating the core to release it from the pastry, holding a set of mold members closed while opening and reclosing another set, finally opening all sets to drop the pastry beginning the final opening act with the set held closed.

10. The method of extracting pastry from pastry molding devices, which devices each include a core and a female mold member, which devices comprise a plurality of sets of separable sections; said method consisting in elevating the core to release it from the pastry, holding a set of mold members closed while opening and reclosing another set, then opening the set which was held closed and later reopening the set which was reclosed.

11. The method of extracting cones from molding devices, which molding devices include a core and separable female mold members; said method consisting in elevating the core sufficiently to release it from the cones, releasing a part of the cone from the female mold members, then grasping that part of the cone which was released and holding it while the remaining part of the cone is released and subsequently releasing the part of the cone which was grasped whereby to entirely disengage the cone and permit it to drop.

12. The method of extracting cones from molding devices, which molding devices include a core and separable female mold members; said method consisting in releasing the female molds from a part of the cone while holding the remaining part of the cone in the female mold, then restoring the mold to that part of the cone which was released to hold the same while releasing the remaining part of the cone and finally entirely releasing the cone to permit it to drop.

13. The method of extracting cones from molding devices, which molding devices include a core and separable female mold members; said method consisting in elevating the core to release it from the cones, releasing a part of the cone from the female mold members, then grasping that part of the cone which was released and holding it while the remaining part of the cone is released and subsequently releasing the part of the cone which was grasped, thereby to entirely disengage the cone, and also restraining the cone against mold following movement to permit it to drop freely.

14. The method of extracting pastry from molding devices which include a core and separable female mold members; said method consisting in elevating the core sufficiently to release it from the pastry; removing a portion of the female mold members from the cone to disengage the same while holding the cone with another portion of the female mold members, then again holding the cone at the place where it had been previously detached from the molds while releasing the undetached portions of the mold from the cone and subsequently entirely releasing the cone.

15. The method of extracting pastry from molding devices which includes a core and separable female mold members; said method consisting in elevating the core sufficiently to release it from the pastry; removing a portion of the female mold members from the cone to disengage the same while holding the cone with another portion of the female mold members, then again holding the cone at a place where it has been previously detached from the mold members by the portion of the female members first removed while releasing the undetached portions of the mold from the cone and subsequently entirely releasing the cone from the female mold members and also restraining the cone against mold following movement.

16. The method of extracting pastry from molding devices which include a core and separable female mold members; said method consisting in elevating the core sufficiently to release it from the pastry; removing a portion of the female mold members from the cone to disengage the same while holding the cone with another portion of the female mold members, then again holding the cone at the place where it had been previously detached from the molds by the portion of the female members first removed while releasing the undetached portions of the mold from the cone and subsequently entirely releasing the cone from the female mold members.

ALBERT E. DIETERICH.